G. W. WIMPEE.
Cotton Harrows and Choppers.
No. 154,110.    Patented Aug. 11, 1874.
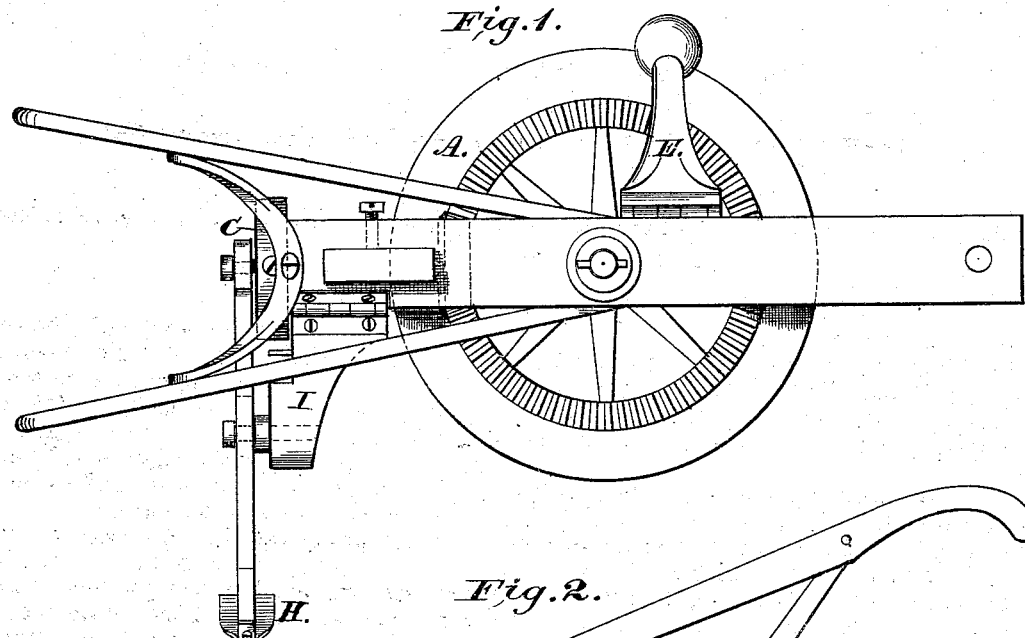
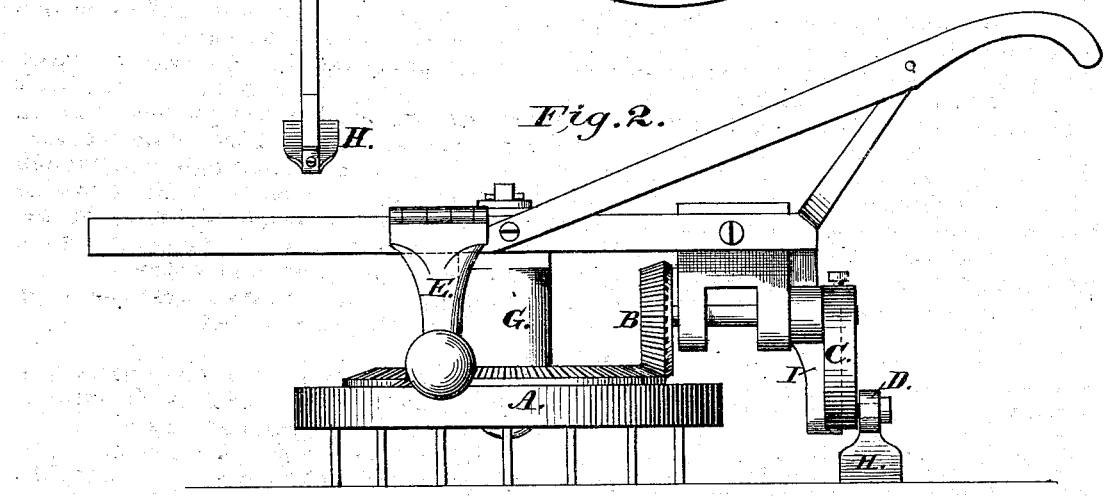
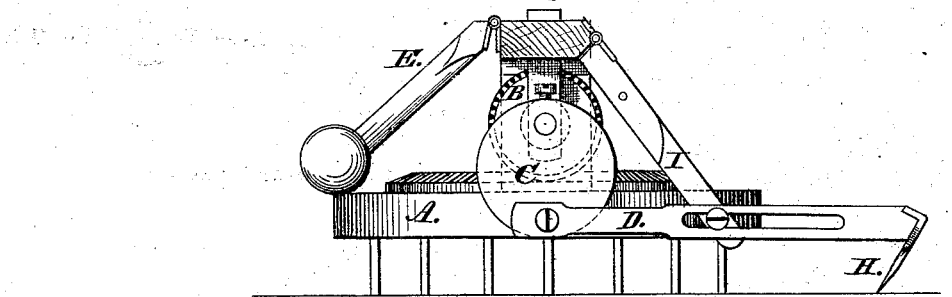

UNITED STATES PATENT OFFICE.

GEORGE W. WIMPEE, OF CENTRE, ALABAMA.

IMPROVEMENT IN COTTON HARROWS AND CHOPPERS.

Specification forming part of Letters Patent No. 154,110, dated August 11, 1874; application filed May 18, 1874.

*To all whom it may concern:*

Be it known that I, G. W. WIMPEE, of Centre, in the county of Cherokee and State of Alabama, have invented a Cotton Harrow and Chopper, of which the following is a specification:

The first part of my invention relates to the combination of a rotating harrow with a cotton-chopper in such a manner that the revolution of the harrow will actuate a reciprocating hoe or cutter, advancing along the furrow and harrowing one side of the row of cotton as it does so. The two processes are combined only in the first working or thinning out to a stand, but the hoe may then be removed and the harrowing continued through the season. The second part of my invention relates to a device by which a long sweeping movement is given to the hoe.

Figure 1 is a plan of the machine. Fig. 2 is a side elevation. Fig. 3 is a partial front elevation, showing the operation and connection of special parts.

A is the harrow revolving in axis C. Its upper periphery is furnished with cogs, which engage a vertical pinion, B, connected by a shaft with an eccentric, c. The eccentric actuates a slotted arm or pitman, D, to the end of which is fixed the hoe or cutter H. The hoe end of the arm D swings upon the end of a pendent rod, I, hinged to the beam of the plow-stock. The rod I is flanged at such a point as to be lifted by the eccentric when the hoe is to be raised for a stroke.

The harrow when operated with the cutter runs with the right side next the cotton-row, and with its teeth impinging the cotton-bed on that side, and is thus caused to rotate from right to left. The weight E may be placed so as to roll upon either the right or left margin of the harrow, as it may be desired to run one or the other side next the cotton.

In executing a stroke, the eccentric raises rod I and by means of it the hoe, and as it turns lets the hoe drop to a position about an inch below the surface of the cotton-bed, then pulls it back in a horizontal right line through the plants, chopping out the width of the hoe or cutter. Having completed the stroke, the eccentric again engages the flange of the rod I and raises the hoe for a new stroke.

I do not claim a rotary harrow, for I am aware that it is not new; but

I claim—

1. The combination of a rotary harrow, A, with a pinion, B, and eccentric C, substantially as and for the purposes described.

2. In a cotton-chopper, the eccentric c, pendent arm I, and slotted arm D, substantially as and for the purposes described.

GEORGE W. $\times$ WIMPEE.
his mark.

Witnesses:
 JOHN PRATT,
 JOHN L. McCONNELL.